United States Patent
Balland-Longeau et al.

(10) Patent No.: US 7,179,870 B2
(45) Date of Patent: Feb. 20, 2007

(54) METHOD FOR THE PREPARATION OF POLY SG(A)-METHYLSTYRENE

(75) Inventors: Alexia Balland-Longeau, Tours (FR); Marc Calonne, Drache (FR); Franck Jousse, Pessac (FR); Jean-Marie Catala, Mundolsheim (FR)

(73) Assignee: Commissariat A L'Energie Atomique, Paris (FR)

( * ) Notice: Subject to any disclaimer, the term of this patent is extended or adjusted under 35 U.S.C. 154(b) by 0 days.

(21) Appl. No.: 10/550,567

(22) PCT Filed: Mar. 29, 2004

(86) PCT No.: PCT/FR2004/050129

§ 371 (c)(1),
(2), (4) Date: Jun. 30, 2006

(87) PCT Pub. No.: WO2004/090001

PCT Pub. Date: Oct. 21, 2004

(65) Prior Publication Data

US 2006/0252896 A1    Nov. 9, 2006

(30) Foreign Application Priority Data

Mar. 31, 2003    (FR) .................................. 03 50081

(51) Int. Cl.
*C08F 2/06*    (2006.01)
*C08F 12/12*    (2006.01)

(52) U.S. Cl. ............................ 526/77; 526/82; 526/84; 526/173; 526/204; 526/912

(58) Field of Classification Search .................. 526/77, 526/82, 84, 173, 204, 912
See application file for complete search history.

(56) References Cited

U.S. PATENT DOCUMENTS 3,069,405 A * 12/1962 McCormick et al. ....... 526/181
4,748,222 A *  5/1988 Malanga ..................... 526/174
4,883,846 A * 11/1989 Moore et al. ................. 526/73

FOREIGN PATENT DOCUMENTS

| DE | 1 225 866 | 9/1966 |
|---|---|---|
| GB | 850909 | 10/1960 |
| GB | 1076897 | 7/1967 |

OTHER PUBLICATIONS

Mitsuo, Abe et al., "Dilute Solution Properties of Monodisperse Poly($\alpha$-methyl styrene)", *Bulletin of the Chemical Society of Japan*, vol. 41, pp. 2330-2336 (1968).
McCormick, Herbert W., "Molecular Weight Distribution of Anionically Polymerized $\alpha$-Methylstyrene", *Journal Of Polymer Science*, vol. XLI, pp. 327-331 (1959).
Tsunashima, Yoshisuke, et al., "On the Anionic Preparation of Poly ($\alpha$-methyl styrene)", *Bull. Inst. Chem. Res., Kyoto Univ.*, vol. 46, No. 2, pp. 37-47 (1968).

* cited by examiner

*Primary Examiner*—Fred Teskin
(74) *Attorney, Agent, or Firm*—Thelen Reid Brown Raysman & Steiner LLP

(57) ABSTRACT

The invention relates to a process for the preparation of poly($\alpha$-methylstyrene) by anionic polymerization of the $\alpha$-methylstyrene monomer, said process successively comprising the following stages:
a) a stage of preparation of a solution comprising the $\alpha$-methylstyrene monomer and a nonpolar aprotic solvent;
b) a stage of neutralization of the solution prepared in a) comprising the addition, to this solution, of an effective amount of at least one monofunctional organometallic initiator, so as to neutralize the proton sources of the solution prepared in a);
c) a stage of cooling the solution obtained in b) to a temperature of less than 0° C.;
d) a stage of initiation of the polymerization comprising the addition, to the cooled solution in c), of a predetermined amount of said monofunctional initiator;
e) a stage of propagation of the polymerization comprising the addition, to the solution obtained in d), of a polar aprotic solvent, said solvent being added in an amount which is lower than that of the nonpolar aprotic solvent;
f) a stage of termination comprising the addition, to the solution prepared in e), of a polar protic solvent.

13 Claims, No Drawings

METHOD FOR THE PREPARATION OF POLY SG(A)-METHYLSTYRENE

CROSS-REFERENCE TO RELATED APPLICATION

This application claims priority based on International Patent Application No. PCT/FR2004/050129, entitled "Method for the Preparation of Poly $G(A)-Methystrene" by Alexia Balland-Longeau, Marc Calonne, Franck Jousse and Jean-Marie Catala, which claims priority of French Application No. 03/50081, filed on Mar. 31, 2003, and which was not published in English.

TECHNICAL FIELD

The present invention relates to a novel process for the preparation of poly($\alpha$-methylstyrene).

Poly($\alpha$-methylstyrene) is a thermoplastic polymer which has applications in numerous fields, in particular in the field of the preparation of materials intended for inertial confinement fusion experiments, in the field of the preparation of deposition surfaces or of depolymerizable mandrels.

STATE OF THE PRIOR ART

Conventionally, poly($\alpha$-methylstyrene) (referred to as PAMS in the continuation of this description) is prepared by anionic polymerization of the $\alpha$-methylstyrene monomer.

Generally, the anionic polymerization corresponds to a chain polymerization during which monomers add to a chain exhibiting, at the end, an anionic entity in combination with a cationic entity. The distinguishing feature of this polymerization is the possibility of preparing polymers without the side reactions usually observed in conventional radical polymerization, namely the transfer and termination reactions, which occur during the propagation stage of a conventional radical polymerization.

In 1959, the authors Cormick et al. described, in the paper "Molecular Weight Distribution of Anionically Polymerized $\alpha$-Methylstyrene" in the Journal of Polymer Science, Vol. XLI, p. 327–331 (1959) [1], a process for the preparation of PAMS by anionic polymerization comprising the following stages:

- an initiation stage which consists in adding, to a solution comprising the $\alpha$-methylstyrene monomer and tetrahydrofuran, a bifunctional initiator of the sodium naphthalene complex type;
- a stage of propagation brought about by the cooling of the solution resulting from the preceding stage to a temperature of less than 0° C.;
- a stage of termination by addition of water and of methanol.

However, this process, when used, exhibits the disadvantage of producing polymers with a high polydispersity index (which can range up to 1.5) and with relatively low molar masses.

The authors Tsunashima et al., in the paper "On the Anionic Preparation of Poly($\alpha$-methylstyrene)" in Bull. Inst. Chem. Res., Kyoto Univ., Vol. 46, No. 2, 1968 [2], propose a process for the anionic polymerization of the $\alpha$-methylstyrene monomer in tetrahydrofuran but this time in the presence of a monofunctional initiator (that is to say, having a single active center), more specifically in the presence of butyllithium. In this process, the rate of the propagation stage is extremely high with respect to that of the initiation stage, which has the effect of increasing the polydispersity index insofar as initiation is not carried out at the same time for all the polymer chains.

According to a completely different approach, the authors Abe et al., in the paper "Dilute Solution Properties of Monodisperse poly($\alpha$-methylstyrene)" in Bulletin of the Chemical Society of Japan, Vol. 41, 2330–2336 (1968) [3], have proposed a process for the preparation of PAMS by anionic polymerization of $\alpha$-methylstyrene in THF in the presence of a specific initiator, composed of a sodium naphthalene complex. This process results in a sample of polymers exhibiting nonhomogeneous molar masses. In order to render the sample more homogeneous, the above-mentioned authors propose to fragment the sample into polymers with molar masses similar to one another by subjecting the sample to treatment in a complex piece of equipment referred to as a "Desreux column".

As emerges from the above paragraph, this process requires, after polymerization, a complex fragmentation stage and for this reason renders this process difficult to transfer to large scale operation.

Thus, the processes for the preparation of poly($\alpha$-methylstyrene) of the prior art all exhibit one or more of the following disadvantages:

- as a result of a propagation stage which takes place at a greater rate than that of the initiation stage, they generally result in polymers which are nonhomogeneous in chain length, that is to say in polymers exhibiting a polydispersity index of greater than 1.1;
- they are difficult to carry out as, in some cases, they involve a fragmentation stage intended to increase the homogeneity of a sample of polymers;
- they do not make it possible to simultaneously control the polydispersity index and the molar mass of the polymers obtained.

The aim of the present invention is to provide a process for the preparation of PAMS which makes it possible to obtain a PAMS with control both of the polydispersity index and of the molar mass of said polymer and which does not exhibit the disadvantages of the processes described in the prior art.

The aim of the present invention is to provide a process for the preparation of PAMS which is simple and inexpensive to implement.

DESCRIPTION OF THE INVENTION

This aim and yet others are achieved by the present invention, which comprises a process for the preparation of a poly($\alpha$-methylstyrene) polymer by anionic polymerization of the $\alpha$-methylstyrene monomer, said process successively comprising the following stages:

a) a stage of preparation of a solution comprising the $\alpha$-methylstyrene monomer and a nonpolar aprotic solvent;

b) a stage of neutralization of the solution prepared in a) comprising the addition, to this solution, of an effective amount of at least one monofunctional organometallic initiator, so as to neutralize the proton sources of the solution prepared in a);

c) a stage of cooling the solution obtained in b) to a temperature of less than 0° C.;

d) a stage of initiation of the polymerization comprising the addition, to the cooled solution obtained in c), of a predetermined amount of said monofunctional organometallic initiator;

e) a stage of propagation of the polymerization comprising the addition, to the solution obtained in d), of a polar aprotic solvent, said polar aprotic solvent being added in an amount which is lower than that of the nonpolar aprotic solvent;

f) a stage of termination comprising the addition, to the solution obtained in e), of a polar protic solvent.

Thus, the process comprises a first stage of preparation of a solution comprising the α-methylstyrene monomer and a nonpolar aprotic solvent. This preparation stage consists in adding, preferably with stirring at ambient temperature, the α-methylstyrene monomer to a nonpolar aprotic solvent or via versa.

Preferably, the nonpolar aprotic solvent used in this stage is a solvent exhibiting a dielectric constant of less than 4.

Particularly advantageous solvents corresponding to this criterion can be aromatic hydrocarbons comprising from 6 to 10 carbon atoms, such as toluene or benzene, or aliphatic hydrocarbons.

Preferably, the nonpolar aprotic solvent used in this stage is toluene.

The process of the invention also comprises a neutralization stage b) intended to remove any proton source present in the solution prepared during stage a). This neutralization stage comprises, in the context of this process, the addition, to the solution prepared during stage a), of a monofunctional organometallic initiator, that is to say a molecule capable, by virtue of the presence of a single active center or reactive functional group, of providing for the creation of anions starting from the monomer during the subsequent initiation stage. This type of initiator can also be referred to as a single-site initiator. The role of the abovementioned initiator during the neutralization stage is to scavenge the protons present in the solution. In practical terms, the addition, preferably dropwise, of the monofunctional initiator for the purpose of neutralizing the solution prepared in a) is accompanied by a change in color of said solution and by a stabilization in said color when the neutralization is complete. The progress of the neutralization stage can be monitored by measuring the absorbance of the solution to which the monofunctional initiator is added, said addition being maintained until a solution is obtained which exhibits an absorbance which is substantially constant as a function of time.

Preferably, the progress of the neutralization stage is monitored using a UV cell. This UV cell will advantageously make it possible to accurately measure the monitoring of the change in the absorbance during the addition of the monofunctional initiator and to halt this addition as soon as the absorbance is found to be substantially constant as a function of time. Preferably, the preparation stage a) and the neutralization stage b) are carried out at ambient temperature.

Once the neutralization stage is complete, the process of the invention also comprises a stage of cooling the solution obtained in b) to a temperature of less than or equal to 0° C.

Preferably, the cooling stage consists in cooling the solution obtained in b) to a temperature ranging from −50 to −10° C., more preferably still ranging from −50 to −25° C.

The use of such a temperature range advantageously contributes to stabilizing the carbanions which will be formed during the subsequent initiation stage.

Insofar as it is an anionic polymerization process, the process of the invention also comprises an initiation stage, that is to say a stage comprising the conversion of the monomer (α-methylstyrene) to an anionic active center. More specifically, this initiation stage, in the context of the invention, comprises the addition, to the solution obtained on conclusion of stage b), of a predetermined amount of the abovementioned monofunctional organometallic initiator (used during the neutralization stage), that is to say the amount of initiator necessary to create active monomers intended to react during the polymerization reaction to give a polymer with a given molar mass.

The novelty of this stage lies in the fact that it is carried out in a nonpolar aprotic solvent.

During the initiation stage, the monomer (α-methylstyrene) is activated by reaction with the monofunctional initiator (symbolized by AB below) according to the following reaction:

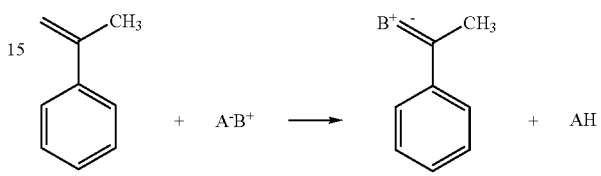

Insofar as the initiation stage is carried out in a nonpolar aprotic solvent, the activated monomer is found in the form of a pair of undissociated ions as a result of the nondissociating power of the solvent. Consequently, insofar as the activated monomer exists in the form of an ion pair, it cannot react with the other activated monomers present in solution and the propagation stage thus cannot be initiated.

Moreover, the fact of using a monofunctional organometallic initiator has the consequence that, during the propagation stage, the polymer chains will be propagated only at just one end, resulting in the formation of polymers with a low dispersion in the molecular masses and consequently a low polydispersity index.

Preferably, the monofunctional organometallic initiator is an organolithium compound. More specifically, this organolithium compound can be chosen from the group consisting of n-butyllithium, sec-butyllithium and tert-butyllithium.

Finally, the propagation stage of the process of the invention comprises the addition, to the solution prepared in c), of a polar aprotic solvent in an amount which is lower than that of the nonpolar aprotic solvent. Preferably, the amount of polar aprotic solvent corresponds to less than 10% by volume of the total volume of solvent (nonpolar aprotic solvent+polar aprotic solvent).

Thus, by adding a polar aprotic solvent in an amount which is lower than that of the nonpolar aprotic solvent, the dissociation of the ion pairs is provided for (which makes possible the initiation of the propagation) while limiting the propagation rate, which would result, if it were too fast, in a considerable increase in the polydispersity index, which is not the desired aim.

It is specified that, according to the invention, in that which precedes and that which follows, the term "polar aprotic solvent" is understood to mean a solvent advantageously exhibiting a dielectric constant of greater than 13.

It is understood that this solvent must be fully miscible in the nonpolar aprotic solvent used for the abovementioned preparation stage a) and must be able to be used at low temperatures, for example at temperatures ranging between −25 and −50° C.

Particularly advantageous solvents corresponding to these criteria can be chosen from the group consisting of tetrahydrofuran and tetrahydropyran.

The novelty of this stage lies in the fact of adding a polar aprotic solvent to the solution resulting from the initiation stage, this solution comprising solely pairs of undissociated ions. The addition of this solvent simultaneously dissociates the ion pairs and thus releases the activated monomers, which will thus be able to react with one another to form the appropriate polymer. The addition of this solvent thus gives a starting point for the propagation stage and, for this reason, contributes to the propagation of the polymerization being carried out virtually simultaneously starting from each of the activated monomers and consequently makes it possible to obtain, on conclusion of this stage, a very homogeneous sample of polymers, that is to say a sample composed of polymers exhibiting number-average molar masses which are very similar to one another.

This is not the case with the processes described in the prior art, where the propagation stage begins even before the initiation stage is complete, the consequence of which is the production of nonhomogeneous samples, that is to say a sample composed of polymers exhibiting highly varied molar masses, i.e. a high polydispersity index.

Preferably, the preparation stage a), the neutralization stage b), the initiation stage d) and the propagation stage e) are carried out under an inert gas atmosphere.

It is specified that the term "inert gas" is understood to mean a gas composed of chemically inactive elements. This gas can be argon, helium or nitrogen.

The process also comprises a termination stage comprising the addition, to the solution prepared in d), of a polar protic solvent, such as an anhydrous alcohol (ethanol, hexanol). This stage occurs when the monomers have been completely consumed in forming the PAMS. The end of the propagation stage can be located by virtue of a kinetic study carried out prior to the implementation of the process, the aim of this kinetic study being to monitor the consumption of monomer as a function of time and to monitor the linearity in the molar masses obtained as a function of yield. It is understood that this kinetic study is entirely within the scope of a person skilled in the art. Preferably, the solution obtained in f) is brought to ambient temperature.

Finally, the process of the invention can additionally comprise, after the termination stage, a stage of isolation of the poly($\alpha$-methylstyrene). This isolation stage is carried out, for example, by running the reaction mixture resulting from stage f) into methanol, followed by filtering off and drying the poly($\alpha$-methylstyrene) obtained.

In practice, the process of the invention can be carried out in the way described below.

The nonpolar aprotic solvent and the $\alpha$-methylstyrene monomer are introduced, preferably with stirring and under an inert gas atmosphere, into a specific reactor exhibiting a volume of 100 to 1500 ml which is preferably connected to a cryostat and to a UV cell. The solvent used is preferably purified beforehand by distillation under an inert atmosphere and over a dehydrating agent (such as sodium). The neutralization stage is subsequently carried out by adding the monofunctional organometallic initiator to the preceding mixture, preferably at ambient temperature. The addition is preferably carried out very slowly, for example dropwise, while the UV cell at the same time determines the absorbance of the solution as a function of time. Once neutralization is achieved, a very slight yellow coloring is obtained and the solution exhibits an absorbance value which is substantially constant as a function of time. Subsequently, the temperature of the mixture is lowered, for example between −50 and −25° C., and then the theoretical amount of monofunctional organometallic initiator necessary to obtain a polymer with the desired number-average molar masses, preferably high number-average molar masses, is added. The mixture is stirred at the temperature set previously for a period of time which can range from 1 to 8 hours. The completion of the initiation stage can also be detected with a UV cell, this completion being reflected by a solution exhibiting an absorbance which is substantially constant as a function of time.

Once the initiation stage is complete, a given amount of polar aprotic solvent, advantageously purified beforehand by distillation, for example under argon and over a dehydrating agent, is added, the volume of polar aprotic solvent added being lower than that of the nonpolar aprotic solvent, the polar aprotic solvent preferably representing less than 10% by volume with respect to the volume of solvent (nonpolar aprotic solvent+polar aprotic solvent). The solution turns red. The propagation stage is preferably carried out with stirring at a temperature preferably ranging from −50 to −25° C. for a period of time, for example of 3 to 50 hours, so as to form the desired polymer. Finally, the polymerization process is completed by a stage of termination by addition of a polar protic solvent, such as an anhydrous alcohol (ethanol, hexanol). The reaction mixture is subsequently brought back, preferably, to ambient temperature and the polymer obtained is then isolated by precipitating from methanol and then by filtering off, followed by drying.

Thus, the process for the preparation of PAMS according to the invention exhibits the following advantages:
- by virtue of the separation of the initiation and propagation stages, due to the judicious use of two categories of solvent in carrying out these stages, this process makes it possible to obtain precise control of these stages;
- by virtue of the precise control of the abovementioned stages, the process of the invention makes possible control both of the polydispersity index and of the molar mass of the polymer obtained and makes possible access to polymers exhibiting a polydispersity index (less than 1.1) and high molar masses (greater than 300 000 g.mol$^{-1}$ with respect to calibration with polystyrene standards);
- by virtue of the control of the various stages participating in this process, a completely reproducible process is thus accessed;
- by virtue of the control of said stages, it is possible to prepare batches with weights of greater than 200 g, if desired.

The invention will now be described from the viewpoint of the following specific examples, which are given by way of illustration and without limitation.

DETAILED DESCRIPTION OF SPECIFIC EMBODIMENTS

The examples which will follow illustrate the preparation of polymers in accordance with the present invention.

In each of these examples, the number-average molar mass and the polydispersity index were measured.

The number-average molar masses and the polydispersity indices were determined by steric exclusion chromatography. Steric exclusion chromatography is based on the principle of liquid chromatography. In the context of these examples, the elution solvent corresponds to THF and the chromatographic device comprises four columns arranged in series and is equipped with a refractometric detector (Waters). Calibration is carried out starting from polystyrene standards.

The number-average molar mass Mn corresponds to the sum of all the masses weighted by the number-average fraction.

The weight-average molar mass Mw corresponds to the sum of all the masses weighted by a coefficient wi which represents the fraction by weight of the entities present (Ewi=1).

The polydispersity index PI corresponds to the ratio of the weight-average molar mass to the number-average molar mass and characterizes the dispersion of the masses around the mean mass.

In each of these examples, the amount of initiator n to be added for the propagation of the polymerization is predetermined by the following method.

It is taken into account that it is desired to prepare a polymer with a number-average molar mass recorded as "theoretical Mn". After a prior kinetics study, a polymerization yield Y is taken into account.

The formula for determining the predetermined amount of initiator to be added is as follows:

$$n=(m/\text{theoretical } Mn) \times R$$

in which:

n corresponds to the predetermined amount of initiator, expressed in moles;

m corresponds to the weight of monomer to be introduced in order to obtain a polymer with the desired theoretical Mn mass, expressed in g;

theoretical Mn corresponds to the number-average molar mass desired for the polymer, expressed in $g.mol^{-1}$;

R corresponds to the polymerization yield, evaluated by virtue of a prior kinetic study.

EXAMPLE 1

This example illustrates the preparation of poly(α-methylstyrene) having a number-average molar mass of 312 000 $g.mol^{-1}$ and a polydispersity index of approximately 1.

Anhydrous toluene (55 ml) and the α-methylstyrene monomer (22 g) are introduced under argon into a specific 100 ml reactor connected to a cryostat equipped with a UV cell. The neutralization step, monitored by virtue of the UV cell, is then carried out at ambient temperature by adding s-BuLi dropwise. When neutralization is achieved, a slight yellow coloring is obtained and the UV absorption is stable. The reaction medium is then placed at −25° C. The predetermined amount of s-BuLi ($7.3 \times 10^{-5}$ mol) necessary to obtain the targeted polymer is added. A quantitative yield is taken into account in determining this predetermined amount.

After stirring at this temperature for 4 hours, the polar aprotic solvent, anhydrous tetrahydrofuran (10 ml), is added. The reaction medium then becomes vivid red. After stirring at −25° C. for 24 hours, the solution becomes viscous. After the monomer has been completely consumed, the polymerization is halted by deactivating the anionic sites, 1 ml of anhydrous alcohol is added at low temperature and the mixture is allowed to return to ambient temperature. The mixture is slowly run into methanol. The polymer obtained is filtered off and dried under vacuum at approximately 40° C. 20 g of poly(α-methylstyrene) are obtained, i.e. a yield of 91%.

The number-average molar mass (Mn) is expressed as polystyrene equivalent:

Number-average molar mass ($Mn$) (in $g.mol^{-1}$)=312 000;

Polydispersity index=1.06.

EXAMPLE 2

This example illustrates the preparation of poly(α-methylstyrene) having a number-average molar mass of 336 000 $g.mol^{-1}$ and a polydispersity index of approximately 1.

Anhydrous toluene (275 ml) and the α-methylstyrene monomer (110 g) are introduced under argon into a specific 700 ml reactor connected to a cryostat equipped with a UV cell. The neutralization step, monitored by virtue of the UV cell, is then carried out at ambient temperature by adding s-BuLi dropwise. When neutralization is achieved, a slight yellow coloring is obtained and the UV absorption is stable. The reaction medium is then placed at −25° C. The theoretical amount of s-BuLi ($3.2 \times 10^{-4}$ mol) necessary to obtain the targeted polymer is added. After stirring at this temperature for 8 hours, the polar aprotic solvent, anhydrous tetrahydrofuran (50 ml), is added. The reaction medium then becomes vivid red. After stirring at −25° C. for 24 hours, the solution becomes viscous. After the monomer has been completely consumed, the polymerization is halted by deactivating the anionic sites, 3 ml of anhydrous alcohol are added at low temperature and the mixture is allowed to return to ambient temperature. The mixture is slowly run into methanol. The polymer obtained is filtered off and dried under vacuum at approximately 40° C. 102 g of poly(α-methylstyrene) are obtained, i.e. a yield of 93%.

The number-average molar mass (Mn) is expressed as polystyrene equivalent:

Number-average molar mass ($Mn$) (in $g.mol^{-1}$)=336 000;

Polydispersity index=1.05.

EXAMPLE 3

This example illustrates the preparation of poly(α-methylstyrene) having a number-average molar mass of 330 000 $g.mol^{-1}$ and a polydispersity index of approximately 1.

Anhydrous toluene (275 ml) and the α-methylstyrene monomer (110 g) are introduced under argon into a specific 700 ml reactor connected to a cryostat equipped with a UV cell. The neutralization step, monitored by virtue of the UV cell, is then carried out at ambient temperature by adding s-BuLi dropwise. When neutralization is achieved, a slight yellow coloring is obtained and the UV absorption is stable. The reaction medium is then placed at −25° C. The theoretical amount of s-BuLi ($3.2 \times 10^{-4}$ mol) necessary to obtain the targeted polymer is added. After stirring at this temperature for 8 hours, the polar aprotic solvent, anhydrous tetrahydrofuran (50 ml), is added. The reaction medium then becomes vivid red. After stirring at −25° C. for 24 hours, the solution becomes viscous. After the monomer has been completely consumed, the polymerization is halted by deactivating the anionic sites, 3 ml of anhydrous alcohol are added at low temperature and the mixture is allowed to return to ambient temperature. The mixture is slowly run into methanol. The polymer obtained is filtered off and dried under vacuum at approximately 40° C. 100 g of poly(α-methylstyrene) are obtained, i.e. a yield of 91%.

The number-average molar mass (Mn) is expressed as polystyrene equivalent:

Number-average molar mass ($Mn$) (in $g.mol^{-1}$)=330 000;

Polydispersity index=1.05.

EXAMPLE 4

This example illustrates the preparation of poly(α-methylstyrene) having a number-average molar mass of 390 000 g.mol$^{-1}$ and a polydispersity index of approximately 1.

Anhydrous toluene (550 ml) and the α-methylstyrene monomer (220 g) are introduced under argon into a specific 1500 ml reactor connected to a cryostat equipped with a UV cell. The neutralization step, monitored by virtue of the UV cell, is then carried out at ambient temperature by adding s-BuLi dropwise. When neutralization is achieved, a slight yellow coloring is obtained and the UV absorption is stable. The reaction medium is then placed at −25° C. The theoretical amount of s-BuLi (5.5×10$^{-4}$ mol) necessary to obtain the targeted polymer is added. After stirring at this temperature for 4 hours, the polar aprotic solvent, anhydrous tetrahydrofuran (100 ml), is added. The reaction medium then becomes vivid red. After stirring at −25° C. for 24 hours, the solution becomes viscous. After the monomer has been completely consumed, the polymerization is halted by deactivating the anionic sites, 6 ml of anhydrous alcohol are added at low temperature and the mixture is allowed to return to ambient temperature. The mixture is slowly run into methanol. The polymer obtained is filtered off and dried under vacuum at approximately 40° C. 190 g of poly(α-methylstyrene) are obtained, i.e. a yield of 90%.

The number-average molar mass (Mn) is expressed as polystyrene equivalent:

Number-average molar mass ($Mn$) (in g.mol$^{-1}$)=390 000;

Polydispersity index=1.05.

The invention claimed is:

1. A process for the preparation of a poly(α-methylstyrene) polymer by anionic polymerization of the α-methylstyrene monomer, said process successively comprising the following stages:
   a) a stage of preparation of a solution comprising the α-methylstyrene monomer and a nonpolar aprotic solvent;
   b) a stage of neutralization of the solution prepared in a) comprising the addition, to this solution, of an effective amount of at least one monofunctional organometallic initiator, so as to neutralize the proton sources of the solution prepared in a);
   c) a stage of cooling the solution obtained in b) to a temperature of less than 0° C.;
   d) a stage of initiation of the polymerization comprising the addition, to the cooled solution obtained in c), of a predetermined amount of said monofunctional organometallic initiator;
   e) a stage of propagation of the polymerization comprising the addition, to the solution obtained in d), of a polar aprotic solvent, said polar aprotic solvent being added in an amount which is lower than that of the nonpolar aprotic solvent;
   f) a stage of termination comprising the addition, to the solution obtained in e), of a polar protic solvent.

2. The process as claimed in claim 1, in which the nonpolar aprotic solvent is chosen from the group consisting of aromatic hydrocarbons comprising from 6 to 10 carbon atoms and aliphatic hydrocarbons.

3. The process as claimed in claim 1, in which the nonpolar aprotic solvent is toluene.

4. The process as claimed in claim 1, in which the monofunctional organometallic initiator is an organolithium compound.

5. The process as claimed in claim 4, in which the organolithium compound is chosen from the group consisting of n-butyllithium, sec-butyllithium and tert-butyllithium.

6. The process as claimed in claim 1, in which the neutralization stage b) is monitored using a UV cell.

7. The process as claimed in claim 1, in which the preparation stage a) and the neutralization stage b) are carried out at ambient temperature.

8. The process as claimed in claim 1, in which the cooling stage consists in cooling the solution obtained in b) to a temperature ranging from −50 to −10° C.

9. The process as claimed in claim 1, in which the polar aprotic solvent is chosen from the group consisting of tetrahydrofuran and tetrahydropyran.

10. The process as claimed in claim 1, in which the polar aprotic solvent is tetrahydrofuran.

11. The process as claimed in claim 1, in which the preparation stage a), the neutralization stage b), the initiation stage d) and the propagation stage e) are carried out under an inert gas atmosphere.

12. The process as claimed in claim 1, additionally comprising, after the termination stage f), a stage of isolation of the poly(α-methylstyrene).

13. The process as claimed in claim 12, in which the stage of isolation of the poly(α-methylstyrene) is carried out by running the reaction mixture resulting from stage f) into methanol, followed by filtering off and drying the poly(α-methylstyrene) obtained.

* * * * *